United States Patent [19]

Matthews et al.

[11] 4,211,304
[45] Jul. 8, 1980

[54] SOUND ABSORBING DEVICE

[76] Inventors: Carl Matthews, 102 Gloucester Road; Elizabeth de Recourt Martyn, 37, Stanhope Gardens, both of London, England

[21] Appl. No.: 888,874

[22] Filed: Mar. 22, 1978

Related U.S. Application Data

[63] Continuation-in-part of Ser. No. 763,547, Jan. 28, 1977, abandoned.

[30] Foreign Application Priority Data

Feb. 3, 1976 [GB] United Kingdom ............... 4258/76
Mar. 13, 1978 [GB] United Kingdom ............... 9918/78

[51] Int. Cl.$^2$ ............................................. F01N 1/24
[52] U.S. Cl. ................................. 181/248; 181/252; 181/258; 181/296
[58] Field of Search ............... 181/222, 224, 247, 252, 181/257, 258, 256, 284, 294, 296, 227, 198, 248; 138/40, DIG. 2

[56] References Cited

U.S. PATENT DOCUMENTS

| 2,073,951 | 3/1937 | Servais | 181/252 |
| 3,920,872 | 11/1975 | Ollinger | 181/284 |
| 3,954,031 | 5/1976 | Tull et al. | 181/198 |

FOREIGN PATENT DOCUMENTS

| 563110 | 7/1944 | United Kingdom | 181/252 |
| 275341 | 12/1970 | U.S.S.R. | 181/252 |

Primary Examiner—L. T. Hix
Assistant Examiner—Benjamin R. Fuller
Attorney, Agent, or Firm—Cushman, Darby & Cushman

[57] ABSTRACT

Acoustic energy is absorbed from a moving fluid by passing the fluid, which is typically a gas, over a surface covered with a multiplicity of loops of fibers or filaments, each loop having one portion thereof fixed to a suitable backing material, the backing material attached directly or indirectly to a conduit or the like and the other free portions extending into the moving fluid stream. Automobile mufflers or silencers effective in reducing or eliminating objectionable noise, but with at most only nominal back pressure, are disclosed.

16 Claims, 2 Drawing Figures

SOUND ABSORBING DEVICE

CROSS-REFERENCE TO RELATED APPLICATION

This application is a continuation-in-part of our application Ser. No. 763,547 filed Jan. 28, 1977 now abandoned.

SUMMARY OF THE INVENTION

The present invention relates to the selective absorption of acoustic energy from kinetic energy under conditions of relative motion between a surface and a fluid.

More particularly the invention provides means for absorbing acoustic energy from a fluid stream, such as a gas, which is a device including a surface past which surface the fluid stream can flow, preferably with minimal loss of kinetic energy due to surface resistance. The surface is provided with a plurality of loops of fibers or filaments of a relatively small diameter, each loop having one of its portions or zones operatively attached to a backing material which, in turn, is attached, either directly or indirectly, to a conduit surface and its other portion or zone extending freely into the fluid stream.

The present invention, in its method aspect, provides for a method of absorbing acoustic energy from a moving fluid stream, usually a gas, by passing the fluid stream over and in contact with at least one surface carrying a multiplicity of loops of fibers or filaments of a relatively small diameter, as described above. The moving fluid stream impinges upon the free ends of the loops and the loops serve to absorb acoustic energy.

The invention is particularly useful, for example, in providing an exhaust system or portion of the exhaust system of any desired shape or configuration for an internal combustion engine such as a motor vehicle, marine craft or aircraft, and specifically as a replacement for a conventional automotive muffler.

The present invention also includes the use of a surface having a plurality of loops of fibers or filaments, as described above, as a portion of an air conditioning-/heating duct which may be oval, square, circular or of any desired cross-sectional shape. The air passing through such a duct is able to flow with only minimal or no loss of kinetic energy due to surface resistance, while at the same time the flexing fibers or filaments serve to silence or muffle the airflow.

The device of the present invention may also be useful as an integument applied to the external or internal face of a solid in order to absorb acoustic radiation from the solid.

According to one feature of the present invention the fiber loops are preferably flexible, their free portions usually extending parallel to and trailing in the fluid with respect to the direction of fluid or surface movement.

The loops may be of inorganic, metal-organic or any suitable material provided that the fibers possess physical and chemical properties appropriate for their integrity and survival for an acceptable period of use in the environment in which they are placed. We prefer that the fibers be part of a continuous loop substrate such as continuous loop pile carpeting made from glass fibers which is commercially available. End uses for such materials are primarily the auto, aircraft and similar internal combustion engines. Devices of the present invention are also applicable to marine craft in which the exhaust gas is cooled, typically by water injection.

The fibers in this instance may be of organic origin, such as polyacrylonitrile or the like. In any event the fibers forming the loops should preferably be of a suitable material having a refractoriness and insolubility. Selection of an appropriate fiber is conveniently determined through preliminary experimentation by one skilled in the art. It is preferred that the average diameter of the fibers or filaments employed will be in the range of about 1 to about 50 microns in size.

The configuration of the fiber loops may be such that they are sufficiently close together so that their free ends define a substantially regular geometrical surface beyond which there is no obstruction, or relatively little obstruction, to the passage of the fluid. Furthermore, since this surface is flexible and of low reflectivity, the acoustic energy present in the fluid is readily transmitted through it and absorbed by the mass of fibres between it and the outer casing. The fiber loops at least initially extend normal to the surface to which their fixed end portions are attached, although over a period of use may become bent or curved in the direction of the fluid flow.

DETAILED DESCRIPTION OF THE DRAWINGS

Figure 1:
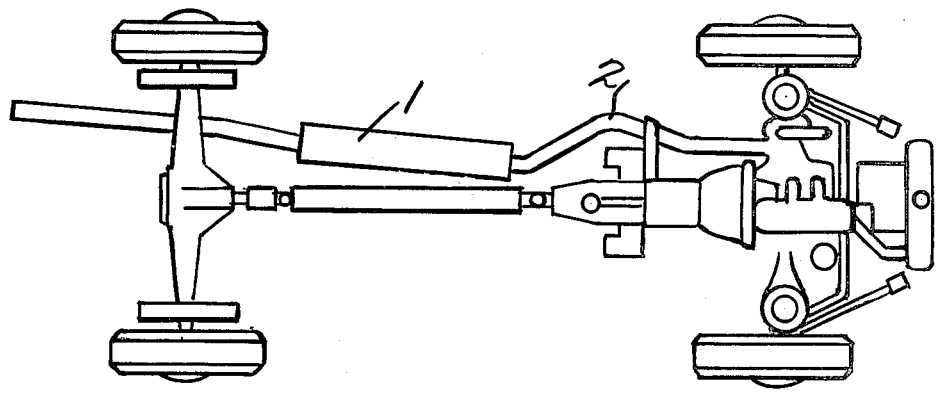
FIG. 1 is top view partial representation of an automobile showing a suggested positioning of the muffler of the present invention.

FIG. 1 depicts an automobile showing the layout of a typical muffler system. The invested pipe or muffler 1 (shown in more detail below) may be situated anywhere along the exhaust line 2. The muffler may, if necessary, comprise more than one invested section. Although this figure shows muffler 1 as being of greater external diameter than exhaust pipe 2, the extention of this enlargement has been (for purposes of illustration) magnified. It is important that the internal annular space in muffler 1 should not be less than the average diameter of the exhaust line 2. In this way no constriction is built into the exhaust line and no additional back pressure is created.

Figure 2:
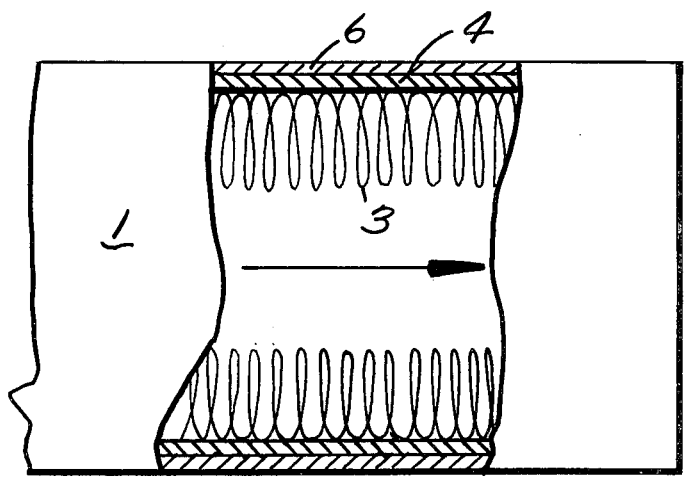
FIG. 2 is a partially broken-away cross-sectional view of a muffler embodiment as being illustrative of the present invention.

FIG. 2 is partially broken away cross-sectional view of muffler 1 in which the continuous loop pile investment 3 woven into a suitable backing 4 is bonded directly to the wall of the muffler casing 6. The backing 4 may be bonded chemically to the wall as with a suitable adhesive or form an intricate part of the muffler wall 6, in which case the bonding is mechanical. Also the continuous loop pile may comprise the backing into which the fiber is woven and at the same time form that part of the silencer pipe which is invested.

DETAILED DESCRIPTION OF THE INVENTION

In FIG. 2 the interior wall of conduit 6, shown in an axial cross-section, is provided with an investment of flexible, uni-directional, closely spaced fiber loops 3. The free end portion of the majority of the fiber loops, after rising from the backing 4 into which they are fixed, at least initially assume positions substantially parallel to the direction of fluid flow.

When the construction of the present invention is used in an automobile engine exhaust system, it has been found that the acoustic energy present in the gas can be absorbed to a very high degree without incurring any substantial decrease in the kinetic energy of the gas.

This device then provides an exhaust which can be totally silent with minimal back pressure, or, at high velocities of flow, pressure of such low value that the engine maintains higher efficiency than is normally the case. This is an important feature of the present invention. A conventional automobile muffler reduces the noise made by the auto engine using a series of baffle plates, packings and walls inside of the muffler. In reducing noise a substantial amount of back pressure is created which decreases the efficiency of the engine. By reducing back pressure, the overall operating efficiency and economy of the engine are improved.

While we have not fully elaborated the theory of operation of our invention, a reasonable explanation appears to be that alternating compression/depression waves of acoustic energy of both longitudinal and transverse propagation are absorbed by reason of the multiplicity of phase changes and this energy is apparently transformed into heat. Also a high viscosity is provided in the closely spaced fiber loops by the very great number of air columns of minute diameters which interspace the filaments, such columns being a factor in the acoustic energy absorption.

Taking an automobile exhaust system as an example, it is preferred that the free end portion of the fiber loops define an opening of about the same cross-sectional area as that of the bore of an incoming exhaust line. To allow the exhaust gases to flow without resistance, the minimum cross-sectional area normally required is maintained as an empty space in the fiber loop field, and the annular space between the empty space and the backing at or near the outer casing is occupied by the fiber loops, as described.

The loop backing may be mechanically or adhesively attached to the conduit interior surface. When so attached an adhesive will be selected to be compatible with the backing and capable of maintaining its integrity during conditions of operation. The backing may be supported, or additionally supported, at intervals by a solid keeper which exerts a retaining pressure on the investment from the fluid face, such retainer having a small cross-sectional dimension. An example of this is an arrangement of small diameter rods or a spiral of rod or wire so introduced that the rod or wire becomes substantially buried in the backing, or it may be attached to the backing by sewing, stapling or other means.

The keeper may even be, for example, a gauze or mesh having a very high percentage of open area. Clearly, the greater the total area of such solid and rigid keeper material which is not well buried into the investment, the less the acoustic absorbent efficiency of the investment will be.

In the event the keeper or retainer is inadvertently exposed to the sound waves present in the fluid, it is possible to arrange, in the case of the spiral rod for example, that the pitch or wave length is an aliquant of the total length of uninterupted pipe section. An aliquot part could conceivably give rise to harmonics of certain frequencies. The leading edge of the investment may be protected from attack by the fluid or gas by insert of a short collett, usually of metal, having one end swaged.

According to the various embodiments of the devices of our invention the fiber loops may extend perpendicularly from the internal wall of the conduit and remain so over the whole of their length. With this arrangement, in use, the fluid flow may cause the fiber loops to bend over at some distance from their point of attachment. So as to provide the optimum or most economical use of materials, a ratio will be established involving several factors such as the amount of incident energy and the statistical data relating to the fiber loops, population per unit area, density or specific gravity, Young's modulus, diameter, and length, particularly that part of the fiber loop investment which is parallel to the direction of fluid flow, effective thickness or depth from the roots when in use, environment humidity, and the length of axial path invested with the fibers.

We have also found that a gas may be released silently yet at high velocity from the end of a conduit such as a compressed air line. For related physical reasons, organ piping is eliminated without reduction of rheological efficiency.

Our invention is not to be considered limited in any way to the silencing of an internal combustion engine as there are diverse areas in which the principles set forth above also apply. Other areas in acoustics where our technique may be applied are those where high noise level impulse waves are produced; the absorbent effect of the investment considerably chops down the initial oscilloscope deflection.

Throughout the above discussion, illustrations, and examples, the unidirection of the loops of fiber and filaments, or at least a majority of them, and consequently minimal reduction in kinetic energy, has been the theme. Paradoxically, the reverse may apply in certain cases. An example of this is that in some marine engine exhausts it is not only preferable, but vitally important to prevent any sea water returning under the force of a heavy wave back up to the engine. Clearly, the investment devices and procedures of our invention produce a resistance to such return flow.

It will be appreciated that various changes and modifications of the above-described invention can be made, and, to the extent that such variations incorporate the spirit of this invention, they are included within the scope of the appended claims.

We claim:

1. A device for absorbing acoustic energy from a moving fluid stream, said device comprising:
   a conduit having an interior surface,
   means for absorbing acoustic energy from fluid stream flowing through said conduit without providing substantial surface resistance to the fluid flow, said means comprising
   a plurality of flexible fiber loops, each such loop having a fixed end thereof operatively attached to a backing and, in turn to at least a portion of said conduit interior surface, and having a free end portion thereof extending inwardly from the conduit interior surface while extending parallel to and trailing in the fluid stream, said free end portions defining a generally regular geometrical surface therein providing an unobstructed fluid flow passage within said conduit.

2. The device as claimed in claim 1 wherein said fibers have an average diameter of 1 to 50 microns.

3. The device as claimed in claim 1 wherein said conduit has a circular cross-section, and wherein said geometrical surface is circular in cross-section and generally concentric with said conduit.

4. The device as claimed in claim 1 further comprising a liner of sound absorbing material disposed between said backing and said conduit interior surface.

5. The acoustic energy absorbing device of claim 1 wherein said plurality of flexible fiber loops is a continuous loop pile carpeting.

6. An exhaust system for an internal combustion engine comprising:
   an exhaust pipe,
   means operatively attached to said exhaust pipe for effectively absorbing the acoustic energy of fluid flowing through said exhaust pipe while allowing passage of the fluid therethrough so that only negligible back pressure is created,
   said means comprising a conduit disposed in line with said exhaust pipe, having an interior surface having a backing in turn attached to a plurality of flexible fiber loops operatively attached to said backing and having a free end portion thereof extending inwardly from the interior surface of said conduit, said free end portions extending generally parallel to, and in the direction of fluid flow in said conduit, such that said fibers define an unobstructed fluid flow passage of generally the same cross-sectional area as the cross-sectional area of said exhaust pipe.

7. The exhaust system as claimed in claim 6 wherein said internal combustion engine is a motor vehicle internal combustion engine.

8. The exhaust system of claim 6 wherein said backing and plurality of flexible fiber loops is a continuous loop pile carpeting.

9. A device for absorbing acoustic energy, from a moving fluid stream, said device comprising:
   a conduit having an interior surface,
   a plurality of fiber loops woven into a backing material, operatively secured to said conduit interior surface, and extending generally radially inwardly from said conduit interior surface while extending parallel to and trailing in the fluid stream, so that the free end portions of said fiber loops define a generally regular geometrical surface providing an unobstructed fluid flow passage within said conduit.

10. The device as claimed in claim 9 wherein said fibers have an average diameter of 1 to 50 microns.

11. The device as claimed in claim 9 wherein said conduit has a circular cross-section, and wherein said geometrical surface is circular in cross-section and generally concentric with said conduit.

12. The device as claimed in claim 9 further comprising means for retaining said backing in place in operative attachment to said conduit interior surface, said means comprising a spiral coil of wire.

13. The device as claimed in claim 9 further comprising means for retaining said backing in place in operative attachment to said conduit interior surface, said means comprising a wire mesh.

14. The acoustic energy absorbing device of claim 9 wherein said fiber loops woven into a backing material is a continuous loop pile carpeting.

15. A method of absorbing acoustic energy from a moving fluid stream, said method comprising:
   providing a conduit having an interior surface,
   providing means for absorbing acoustic energy from a fluid stream and,
   flowing said fluid stream through said conduit without causing substantial surface resistance to the fluid flow, said means comprising
   a plurality of flexible fiber loops, each such loop having a fixed end thereof operatively attached to a backing and, in turn to at least a portion of said conduit interior surface, and having a free end portion thereof extending inwardly from the conduit interior surface while extending parallel to, flexing and trailing in the fluid stream, said free end portions defining a generally regular geometrical surface therein providing an unobstructured fluid flow passage within said conduit.

16. A method of absorbing acoustic energy from the exhaust system of an internal combustion engine comprising providing means operatively attached to the exhaust pipe of said engine for effectively absorbing the acoustic energy of fluid flowing through said exhaust pipe and
   flowing fluid through said exhaust pipe while allowing passage of the fluid therethrough so that only negligible back pressure is created,
   said means comprising a conduit disposed in line with said exhaust pipe, having an interior surface having a backing in turn attached to a plurality of flexible fiber loops operatively attached to said backing and having a free end portion thereof extending inwardly from the interior surface of said conduit, said free end portions extending generally parallel to, and in the direction of fluid flow in said conduit, such that said fibers flex and define a unobstructured fluid flow passage of generally the same cross-sectional area as the cross-sectional area of said exhaust pipe.

* * * * *